United States Patent
Wettling et al.

(10) Patent No.: US 7,038,008 B2
(45) Date of Patent: May 2, 2006

(54) METHOD FOR THE PROCESSING OF A LIQUID REACTION DISCHARGE OF THE CATIONIC POLYMERIZATION OF ISOBUTENE

(75) Inventors: Thomas Wettling, Limburgerhof (DE); Dirk Borchers, Kapellen (DE); Heinz Auer, Neulussheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/473,583

(22) PCT Filed: Apr. 10, 2002

(86) PCT No.: PCT/EP02/04000

§ 371 (c)(1),
(2), (4) Date: Oct. 9, 2003

(87) PCT Pub. No.: WO02/088053

PCT Pub. Date: Nov. 7, 2002

(65) Prior Publication Data

US 2004/0092707 A1    May 13, 2004

(30) Foreign Application Priority Data

Apr. 11, 2001  (DE)  ................................ 101 18 182

(51) Int. Cl.
*C08G 61/00*  (2006.01)
*B01D 35/18*  (2006.01)
*C02F 1/00*  (2006.01)

(52) U.S. Cl. ...................... 528/396; 528/500; 528/501; 528/503; 210/774; 210/788

(58) Field of Classification Search ................ 528/396, 528/500, 501, 503; 210/774, 788
See application file for complete search history.

(56) References Cited

U.S. PATENT DOCUMENTS

| 3,280,091 A | 10/1966 | Dance |
| 5,408,018 A | 4/1995 | Rath |
| 6,518,373 B1 | 2/2003 | Rath et al. |
| 6,642,329 B1 | 11/2003 | Rath |
| 6,753,389 B1 | 6/2004 | Rath et al. |

FOREIGN PATENT DOCUMENTS

| DE | 199 48 947 | 4/2001 |
| DE | 199 52 030 | 5/2001 |
| DE | 199 52 031 | 5/2001 |
| EP | 0 628 575 | 12/1994 |
| EP | 1 026 175 | 8/2000 |
| WO | 99 60028 | 11/1999 |

*Primary Examiner*—Duc Truong
(74) *Attorney, Agent, or Firm*—Oblon, Spivak, McClelland, Maier & Neustadt, P.C.

(57) ABSTRACT

A process for working up a liquid reaction discharge of the cationic polymerization of isobutene, which substantially comprises polyisobutene, unconverted isobutene and an inert diluent, in which the reaction discharge is heated and is let down into a flash container, is described, the reaction discharge separating, as a result of the flashing, into a polyisobutene-containing liquid phase and a gas phase containing the main amount of the isobutene contained in the reaction discharge and of the diluent.

10 Claims, 1 Drawing Sheet

METHOD FOR THE PROCESSING OF A LIQUID REACTION DISCHARGE OF THE CATIONIC POLYMERIZATION OF ISOBUTENE

BACKGROUND OF THE INVENTION

1. Field of the Invention

The present invention relates to a process for working up a liquid reaction discharge of the cationic polymerization of isobutene, which substantially comprises polyisobutene, unconverted isobutene and an inert diluent.

2. Description of the Background

High molecular weight polyisobutenes having molecular weights of up to several 100 000 Dalton have long been known and their preparation is described, for example, in H. Güterbock: Polyisobutylen und Mischpolymerisate, pages 77–104, Springer, Berlin 1959. The highly reactive polyisobutenes which have a high content of terminal vinylidene groups, preferably substantially more than 60 mol %, should be distinguished from these conventional polyisobutenes. Highly reactive polyisobutenes are desirable intermediates for the preparation of additives for lubricants and fuels.

Such highly reactive polyisobutenes are obtainable, for example, by the process of EP 0 628 575, by cationic polymerization of isobutene in the liquid phase with the aid of boron trifluoride and a secondary alcohol at from 0 to −60° C.

The prior patent applications DE 199 48 947.5, DE 199 52 031.3, DE 199 52 030.5, DE 100 28 585.6 and DE 100 35 298.7 relate to improvements or advantageous embodiments of such a process.

Owing to the comparatively high viscosity of polyisobutene at room temperature and below, the polymerization of isobutene is carried out as a rule in the presence of an inert diluent. The diluent used serves in particular for reducing the increase in the viscosity of the reaction mixture which is observable during the polymerization reaction, to such an extent that the resulting heat of reaction can be removed sufficiently rapidly. After the desired molecular weight has been reached, the reaction is stopped by deactivating the polymerization catalyst. Preferably, the polymerization catalyst or its deactivation products is or are removed by extraction with an aqueous solution.

The polyisobutene formed is then freed from the unconverted isobutene and the diluent, which is usually effected by distillation, first the readily volatile isobutene and then the diluent having a higher boiling point than isobutene being distilled off. The polyisobutene remains as a distillation residue. The thermal load during the distillation is however problematic because residues of deactivation products of the polymerization catalyst, for example traces of hydrogen fluoride, can, on heating, lead to undesired secondary reactions of the unconverted isobutene or subsequent reactions of the polyisobutene formed. One undesired subsequent reaction is, for example, the acid-catalyzed isomerization of a polyisobutene molecule having a terminal vinylidene double bond to a polyisobutene molecule in which the double bond occupies a thermodynamically more favorable position in the interior of the molecule. Undesired secondary reactions of the unconverted isobutene are, for example, the dimerization to isooctene or the formation of tert-butanol from isobutene and traces of water contained in the reaction mixture.

SUMMARY OF THE INVENTION

In principle, it is desirable to use the heating and cooling energy employed for distillation as economically as possible and to avoid heating up to a very high temperature level or cooling to a very low temperature level.

It is an object of the present invention to provide a process for working up a liquid reaction discharge of the cationic polymerization of isobutene which substantially avoids undesired secondary and subsequent reactions and permits an efficient use of energy.

We have found that this object is achieved, according to the invention, by a process in which the reaction discharge is heated and is let down into a flash container, the reaction discharge separating, as a result of the flashing, into a polyisobutene-containing liquid phase and a gas phase containing the main amount of the isobutene contained in the reaction discharge and at least 30% of the diluent contained in the reaction discharge.

DETAILED DESCRIPTION OF THE PREFERRED EMBODIMENTS

The reaction discharge typically contains from 20 to 60% by weight of polyisobutene, from 0.5 to 20% by weight of isobutene and from 40 to 79.5% by weight of diluent. It may also contain minor amounts of other components, such as traces of the added catalyst deactivator, e.g. alcohol, or secondary products thereof with isobutene, in particular ether, traces of hydrogen fluoride or water. These components are generally present in an amount of less than 5, mostly less than 1, % by weight.

The reaction discharge in which the polymerization catalyst has been deactivated and/or from which the polymerization catalyst or deactivation products thereof has or have preferably been removed, as described in detail further below, is heated in a heat exchanger, preferably to a temperature of from 40 to 200° C., in particular from 40 to 140° C., particularly preferably from 40 to 120° C. During this procedure, the reaction discharge is under a pressure which as a rule corresponds to that of the polymerization system and is, for example, from 2 to 30, preferably from 2 to 20, bar. The heated reaction discharge is then let down into a flash container which is under a pressure of in general from 1 to 10, preferably from 1 to 8, particularly preferably from 1 to 5, bar. The pressure difference in the flash is preferably at least 1, in particular at least 3, bar.

As a result of the flashing, the reaction discharge separates into a polyisobutene-containing liquid phase and a gas phase containing the main amount of the isobutene contained in the reaction discharge and the main amount of the diluent contained in the reaction discharge. Preferably, the temperature to which the reaction discharge is preheated and the pressure difference in the flashing are chosen so that the gas phase contains at least 90%, in particular at least 95%, of the isobutene contained in the reaction discharge and at least 30%, in particular at least 40%, particularly preferably at least 60%, of the diluent contained in the reaction discharge. Suitable combinations of temperature and pressure difference can be readily estimated by a person skilled in the art on the basis of the known values of the specific heat capacity of polyisobutene, isobutene and the diluent and the specific enthalpy of vaporization of isobutene and of the diluent, or alternatively can be determined by simple experiments.

The gas phase formed during the flashing is removed and is expediently condensed to a liquid isobutene/diluent mixture which, expediently after washing with water, can be recycled to the polymerization reaction. Advantageously, the isobutene/diluent mixture condenses even at a relatively high temperature as pure isobutene since the liquefaction of the isobutene is favored by its physical solubility in the diluent. Since this dispenses with the requirement for cooling to very low temperatures in order to condense the isobutene, the novel process is very economical.

The liquid phase obtained during flashing is freed from any residues of unconverted isobutene and diluent present, for example by simple distillation or further heating and flashing.

The design of the flash container is not subject to any substantial restrictions. The heated reaction discharge is preferably introduced into the flash container in such a way that a large liquid surface which favors the expulsion of the gas phase from the liquid phase by evaporation is produced on entry into the container. For this purpose, it has proven advantageous to use a preferably elongated, vertically arranged flash container having a circular cross section and to introduce the heated reaction discharge tangentially to the wall of the flash container, preferably in a direction perpendicular to the longitudinal axis of the flash container. In this way, the reaction discharge flows along the container wall and follows its curvature, with the result that the reaction discharge experiences a torsion and moves downward in the flash container spirally along the circumference of the container wall.

A preferably used flash container is a column, the heated reaction discharge being fed laterally into a column region free of internals, preferably in the region of the middle of the column or in the upper region of the column. The resulting liquid phase is suitably passed over internals having separation activity, in the lower region of the column used as a flash container, in order to create a very large phase interface and to complete the expulsion of the gas phase by evaporation. For example, bubble trays or preferably packings are suitable as internals having separation activity. Bottom heating can be used but is not important for the novel process.

In the novel process, the polyisobutene contained in the reaction discharge is subjected only briefly to thermal load, so that subsequent reactions, such as undesired isomerizations, are suppressed. It is also advantageous that the traces of water which are contained in the reaction discharge pass over substantially into the gas phase during the flash according to the invention.

The cationic polymerization of isobutene in the presence of a Lewis acid catalyst can be carried out continuously or batchwise but is preferably carried out continuously. Processes for the continuous polymerization in the liquid organic phase are known per se. In a continuous process, a part of the reaction mixture formed in the polymerization reaction is discharged continuously. An amount of starting materials, in this case isobutene or isobutene-containing feed, which corresponds to the discharge is fed continuously to the polymerization reactor. The ratio of the amount of substance present in the polymerization reactor to the amount which is discharged is determined by the circulation/feed ratio, which, in the continuous polymerization of isobutene to polyisobutene, is as a rule from 1 000:1 to 1:1, preferably from 500:1 to 5:1, in particular from 200:1 to 30:1. The average residence time of the isobutene to be polymerized in the polymerization reactor may be from five seconds to several hours. Residence times of from 1 to 30, in particular from 2 to 20, minutes are particularly preferred.

The polymerization of the isobutene is effected in conventional reactors, such as stirred kettles, tubular reactors, tube-bundle reactors and loop reactors, loop reactors, i.e. tubular or tube-bundle reactors having stirred kettle characteristics, being preferred. Tubular reactors having tube cross sections which lead to turbulence in segments are particularly preferred.

The polymerization is usually carried out at a reaction temperature of from −60 to +400° C., in particular from −30 to 0° C., particularly preferably from −25 to −5° C. The heat of polymerization is accordingly removed with the aid of a cooling apparatus. This may be operated, for example, using liquid ammonia as a coolant. Another possibility for removing the heat of polymerization is by evaporative cooling. The heat liberated is removed by partial evaporation of the reaction mixture, for example of the isobutene and/or other readily volatile components of the isobutene feed, or of a readily volatile diluent. Isothermal conditions are preferably employed, i.e. the temperature of the liquid organic reaction phase in the polymerization reactor has a constant value and changes only slightly, if at all, during the operation of the reactor.

The concentration of the isobutene in the liquid reaction phase is as a rule from 0.2 to 50, preferably from 0.5 to 20, % by weight, based on the liquid organic phase.

Suitable feedstocks of both isobutene itself and isobutene-containing $C_4$-hydrocarbon streams, for example refined $C_4$ fractions, $C_4$ cuts from the dehydrogenation of isobutane, $C_4$ cuts from steam crackers or FCC crackers (fluid catalyzed cracking), provided that they have been substantially freed from 1,3-butadiene contained therein. Suitable $C_4$-hydrocarbon streams contain, as a rule, less than 500 ppm, preferably less than 200 ppm, of butadiene. The presence of 1-butene, cis- and trans-2-butene is substantially uncritical. The isobutene concentration in the $C_4$-hydrocarbon streams is typically from 40 to 60% by weight. When $C_4$ cuts are used as starting material, the hydrocarbons other than isobutene play the role of an inert diluent. The isobutene-containing feed may contain small amounts of contaminants, such as water, carboxylic acids or mineral acids, without there being any critical decreases in yield or selectivity. It is expedient to avoid an enrichment of these impurities by removing such pollutants from the isobutene-containing feed, for example by adsorption on solid adsorbents, such as active carbon, molecular sieves or ion exchangers.

Suitable diluents are those solvents or solvent mixtures which are inert to the reagents used. Suitable diluents are, for example, saturated hydrocarbons, such as butane, pentane, hexane, heptane, octane, e.g. n-hexane or isooctane, or cyclopentane, halogenated hydrocarbons, such as methyl chloride, dichloromethane or trichloromethane, and mixtures of the abovementioned diluents, among which n-hexane is particularly preferred. Before they are used, the diluents are preferably freed from impurities, such as water, carboxlic acids or mineral acids, for example by adsorption on solid adsorbents, such as active carbon, molecular sieves or ion exchangers.

For the removal of the heat of reaction, it is advantageous to employ high dilution, i.e. a large amount of diluent in the reaction mixture. On the other hand, a large amount of diluent reduces the amount of polyisobutene obtainable per reactor volume and adversely affects the cost-efficiency of the process. In practice, a compromise is therefore made between high reactor volume utilization and—for removal of heat of reaction—sufficiently low viscosity at the reaction temperature. The optimum amount of diluent can be determined by a person skilled in the art in a simple manner by reducing the amount of diluent in the reaction mixture to just before the point at which the heat of reaction can no longer be removed rapidly enough. An increase in the temperature in the reactor and possibly an incipient deterioration in the product quality indicate that the amount of diluent has fallen below the optimum amount.

A particularly preferred Lewis acid catalyst is boron trifluoride, preferably in combination with a cocatalyst. Boron trifluoride is expediently used in the form of gaseous boron trifluoride, it being possible to use technical-grade boron trifluoride still containing small amounts of sulfur dioxide or $SiF_4$, but high-purity boron trifluoride having a purity of about 99.5% by weight is preferably used.

Suitable cocatalysts are as a rule oxygen-containing compounds which preferably contain at least one divalent oxygen atom. Suitable oxygen-containing compounds in addition to water are organic compounds of up to 30 carbon atoms. Examples of these are $C_1$–$C_{30}$-alkanols and $C_1$–$C_{30}$-cycloalkanols, $C_2$–$C_{10}$-diols, $C_1$–$C_{20}$-carboxylic acids, $C_4$–$C_{12}$-carboxylic anhydrides and $C_2$–$C_{20}$-dialkyl ethers. Preferred among these are monohydric alcohols of 1 to 20, in particular 1 to 4, carbon atoms, which, if required, may be used together with the $C_1$–$C_{20}$-dialkyl ethers. Monohydric secondary $C_3$–$C_{20}$-alkanols and tert-butyl ether are particularly preferred as cocatalysts. Examples are isopropanol, 2-butanol, sec-pentanol, sec-hexanol, sec-heptanol, sec-octanol and the like. 2-Butanol, isopropanol, methyl tert-butyl ether and ethyl tert-butyl ether are particularly preferably used.

The molar ratio of boron trifluoride to cocatalyst is preferably from 1:1 to 1:10, in particular from 1:1.1 to 1:5, particularly preferably from 1:1.2 to 1:2.5. The boron trifluoride and the cocatalyst can be reacted beforehand with formation of a complex or can be combined in situ in the reaction mixture.

The concentration of the combination of boron trifluoride and cocatalyst in the reactor is as a rule from 0.005 to 1, in particular from 0.01 to 0.7, particularly preferably from 0.015 to 0.5, % by weight, based on the liquid organic phase.

After the desired degree of polymerization has been reached, the catalyst is separated off and/or deactivated and the polymerization is stopped in this way. The catalyst deactivation can be effected using deactivators, for example water, alcohols, acetonitrile, ammonia or aqueous solutions of mineral bases or carbonates, which are added to the reaction mixture. Acidified aqueous solutions can also be used for this purpose. Instead of quantitatively deactivating the catalyst in the reaction mixture, it can either be quantitatively separated from the reaction mixture, or some of it can be separated from the reaction mixture and the remaining catalyst deactivated in the reaction mixture. The catalyst is advantageously separated off according to the description of WO 99/31151.

For separating the catalyst from the reaction mixture, it is advisable to reduce the isobutene concentration beforehand to less than 2, preferably less than 1, in particular less than 0.5, % by weight, based on the reaction mixture. For separating off the catalyst, preferably soluble boron trifluoride complex catalysts having limited solubility in the reaction mixture are used and/or the reaction mixture is cooled to temperatures of, for example, from 5 to 30, preferably from 10 to 20, Kelvin below the reaction temperature.

In a further working-up operation, the reaction discharge is expediently subjected to one or more extractions—usually with water—to remove remaining amounts of catalyst.

The isobutene polymer has, as a rule, a number average molecular weight $M_n$ of from 500 to 50 000 and a content of terminal vinylidene groups of more than 60, in particular more than 80, mol %. The dispersity $M_w/M_n$ is preferably not more than 1.9, in particular not more than 1.8.

The present invention is illustrated in more detail by the attached figures and the examples and comparative examples below.

Figure 1:
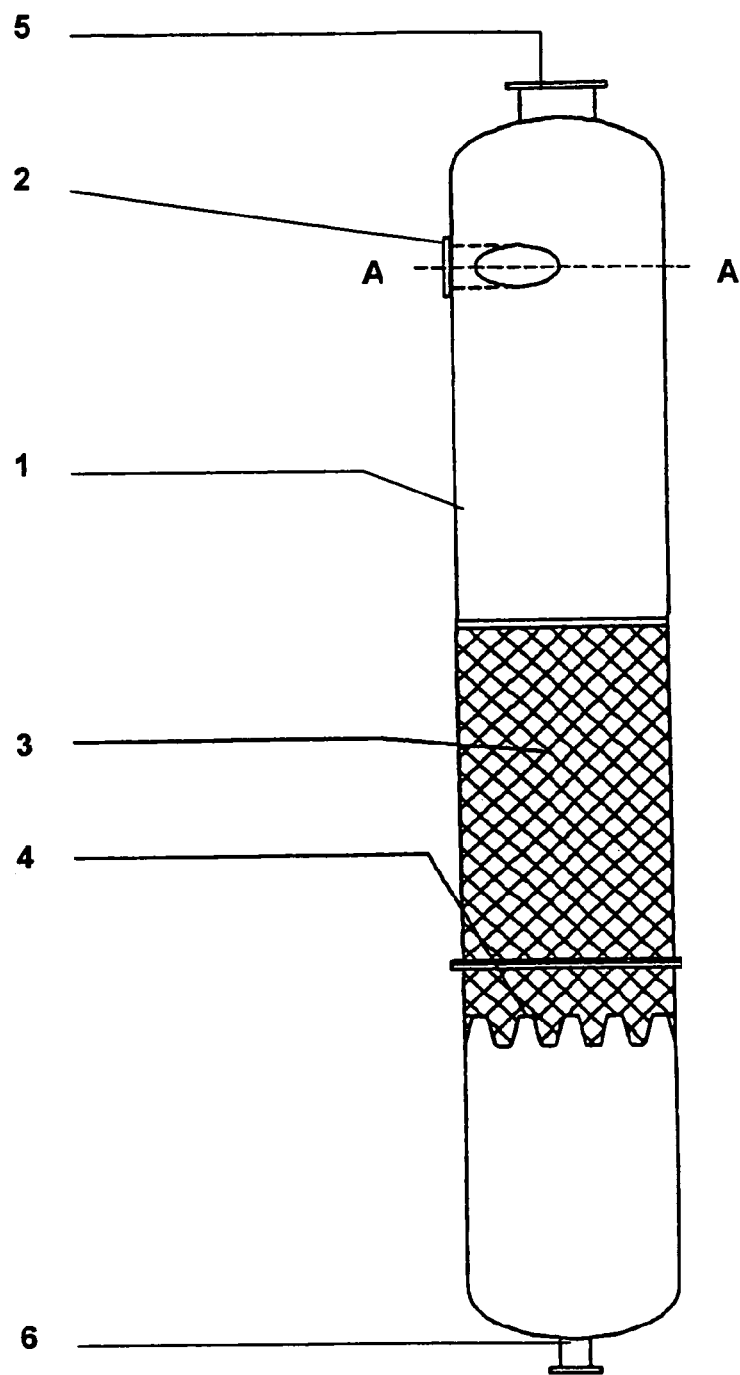
FIG. 1 shows the longitudinal section of a flash container which is advantageously used in the novel process.
Figure 2:
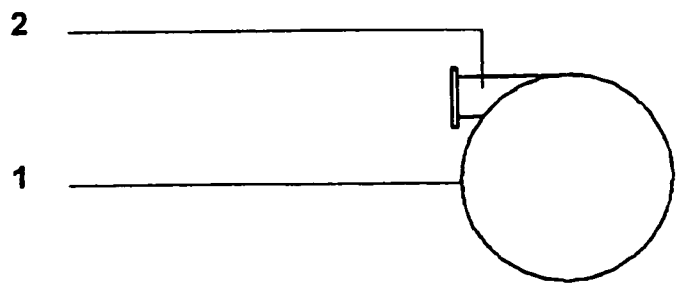
FIG. 2 shows a cross section through the flash container along the line marked "A—A" in FIG. 1.

The flash container 1 according to FIG. 1 has an elongated cylindrical shape, the orifice 2 for introducing the heated reaction discharge being flange-connected tangentially to the sidewall. The gas phase forming during the flashing can be taken off via the orifice 5, and the liquid phase via the orifice 6. The flash container 1 has a packing 3 which rests on a support 4. FIG. 2 shows the tangential arrangement of the orifice 2 relative to the cylindrical flash container 1 in cross section.

EXAMPLES 1 TO 3

For the preparation of a polyisobutene, the process according to EP-A 628 575, example 1, was used: The isobutene-containing feed employed corresponded to the following composition:

| | |
|---|---|
| Isobutane | <1% by weight |
| n-Butane | <1% by weight |
| 1-Butene | <1% by weight |
| trans-2-Butene | <1% by weight |
| cis-2-Butene | <1% by weight |
| Isobutene | 45% by weight |
| Hexane | 54% by weight |
| Butadiene | <50 ppm |
| Water | about 2 ppm |

In the course of one hour, 6 000 g of the above feed were fed to the suction side of a loop reactor which was equipped with an integrated circulation pump whose pipe diameter was 4 mm and whose volume was 1 000 ml. Y mmol/1 000 g of feed (cf. table below) of boron trifluoride were added. 1.6 times the molar amount, based on the boron trifluoride, of 2-butanol was added. The reactor was cooled so that the temperature in the reaction medium was X° C. (cf. table below). The average residence time of the reaction medium in the reactor was 6.6 minutes. The reaction discharge was then thoroughly mixed with 2 000 g per hour of water at 90° C., a temperature of from 35 to 45° C. resulting. The resulting two phases were then separated. The lower phase contained the washwater. The upper phase (referred to below as crude product) consisted of polyisobutene, isobutene, isobutene oligomers, residual isobutene and the solvent hexane and was used in all examples below.

The crude product was passed in a pressure system over a heat exchanger heated with 16 bar steam (about 200° C.). A temperature of 140° C. and a pressure of 14 bar were established in the crude product. The heated crude product was then passed tangentially into the upper third of a cylindrical flash container. In the middle third of the flash container, a bed of stainless steel Pall rings was arranged. On introduction into the flash container, the heated crude product was let down from 14 to 2.2 bar. During the flashing, the isobutene, hexane and further readily volatile components of the crude product evaporated. They were taken off as distillate at the top of the flash container.

The results are listed in the table below:

| Ex. | Crude product Isobutene (%) | X Reaction temperature [°C.] | Y BF$_3$ [mol/1 000 g] |
|---|---|---|---|
| 1 | 5.5 | −17 | 7.1 |
| 2 | 1.3 | −17 | 19.8 |
| 3 | 0.9 | −8 | 19.8 |

| | Distillation bottom product | | | Distillate | | |
|---|---|---|---|---|---|---|
| Ex. | M$_n$ (PIB) | Vinylidene (%) | Dispersity | Iso-octenes (ppm) | t-BuOH (ppm) | tert-Butyl fluoride (ppm) |
| 1 | 2 387 | 84.3 | 1.785 | 780 | 59 | <20 |
| 2 | 956 | 87.3 | 1.689 | 1 359 | <20 | <20 |
| 3 | 658 | 85.3 | 1.652 | 1 988 | <20 | <20 |

We claim:

1. A method of processing the liquid reaction material discharged from an isobutene polymerization reactor in which isobutene is subject to cationic polymerization, comprising a flashing step wherein the flashing step consists of:
flashing a liquid feed which is the liquid discharged from said polymerization reactor that consists essentially of polyisobutene, unconverted isobutene and an inert diluent in a flash container with the result that the liquid material is separated into a polyisobutene-containing liquid phase and a gas phase containing at least 90% of the isobutene that is present in the discharged liquid reaction material and at least 30% of the diluent that is present in the discharged liquid reaction material.

2. The process as claimed in claim 1, wherein the pressure difference in the flash is at least 1 bar.

3. The process as claimed in claim 1, wherein the internal pressure within the flash container ranges from 1 to 10 bar.

4. The process as claimed in claim 1, wherein the flash container has a substantially circular cross section and the discharged liquid reaction material, which is heated, is introduced tangentially into the flash container.

5. The process as claimed in claim 1, wherein the discharged liquid reaction material, which is heated, is introduced into a middle to upper region of the flash container and the resulting liquid phase is passed over internals having separation activity and present in the lower region of the flash container.

6. The process as claimed in claim 5, wherein the internals in the flash container are a packing material that has separation activity.

7. The process as claimed in claim 1, wherein the discharged liquid reaction material is heated to a temperature ranging from 40 to 200° C.

8. The process as claimed in claim 1, wherein the gas phase is condensed to a liquid isobutene/diluent mixture which is recycled to the polymerization reaction.

9. The process as claimed in claim 1, wherein the liquid material is separated into a polyisobutene-containing liquid phase in the flash container and the gas phase obtained contains at least 95% of the isobutene that is present in the discharged liquid reaction material and at least 40% of the diluent that is present in the discharged liquid reaction material.

10. The process as claimed in claim 1, wherein the inert diluent is a saturated hydrocarbon or a halogenated hydrocarbon.

* * * * *

UNITED STATES PATENT AND TRADEMARK OFFICE
CERTIFICATE OF CORRECTION

| | | |
|---|---|---|
| PATENT NO. | : 7,038,008 B2 | Page 1 of 1 |
| APPLICATION NO. | : 10/473583 | |
| DATED | : May 2, 2006 | |
| INVENTOR(S) | : Wettling et al. | |

It is certified that error appears in the above-identified patent and that said Letters Patent is hereby corrected as shown below:

On the title page, Item (75), the 2$^{nd}$ Inventor's Country is incorrect. Item (75) should read:

-- (75) Inventors: Thomas Wettling, Limburgerhof (DE);
                              Dirk Borchers, Kapellen (BE);
                              Heinz Auer, Neulussheim (DE) --

Signed and Sealed this

Twenty-second Day of August, 2006

JON W. DUDAS
*Director of the United States Patent and Trademark Office*